United States Patent
Hums et al.

[11] Patent Number: 5,866,499
[45] Date of Patent: Feb. 2, 1999

[54] PROCESS FOR PRODUCING A CATALYST

[75] Inventors: Erich Hums, Hessdorf; Michael Kotter, Bruchsal; Friedrich Weyland, Wiesloch, all of Germany

[73] Assignee: Siemens Aktiengesellschaft, Munich, Germany

[21] Appl. No.: 554,599

[22] Filed: Nov. 6, 1995

Related U.S. Application Data

[63] Continuation of PCT/DE94/00512 May 5, 1994.

[30] Foreign Application Priority Data

May 6, 1993 [DE] Germany .............................. 43 15 062
Dec. 2, 1993 [DE] Germany .............................. 43 41 160

[51] Int. Cl.$^6$ .............................. B01J 23/28; B01J 23/22
[52] U.S. Cl. .......................... 502/321; 502/309; 502/312
[58] Field of Search ..................................... 502/308, 309, 502/312, 321

[56] References Cited

U.S. PATENT DOCUMENTS 3,907,833 9/1975 Slinkard et al. ..................... 260/346.8
4,108,913 8/1978 Spoerke et al. ...................... 260/669 R
5,270,277 12/1993 Hums ...................... 502/248

FOREIGN PATENT DOCUMENTS 0375391 6/1990 European Pat. Off. .
0470334 2/1992 European Pat. Off. .

Primary Examiner—Michael L. Lewis
Assistant Examiner—Alexander G. Ghyka
Attorney, Agent, or Firm—Herbert L. Lerner; Laurence A. Greenberg

[57] ABSTRACT

In the production of a catalyst containing a catalytically active Mo—V—O phase, the problem exists of keeping the Mo—V—O phase and/or an Mo—V—Ti—O phase substantially free of other catalytically active impurities in order not to catalyze competing reactions at the same time. For this purpose, the invention provides that vanadium oxide and molybdenum oxide are mixed in a ratio of 0.7 to 1% by weight based on $V_2O_5$ and $MoO_3$, the mixture is heated to a temperature above 500° C., the Mo—V—O phase is cooled, ground and then subjected to a reducing treatment, and dispersed on a heated oxidic support, the dispersed material is then ground, and then applied to a suitable macroscopic support, optionally with further additives, and calcined. Alternatively, the material dispersed on the oxidic support can be kneaded with additives to form an extrudable compound, and the compound can be extruded and then calcined so that the honeycomb bodies produced from the compound have crosspiece widths in a range of from 0.1 to 0.6 mm and cell densities of 50 to 1200 cells per square inch.

18 Claims, 4 Drawing Sheets

PROCESS FOR PRODUCING A CATALYST

CROSS-REFERENCE TO RELATED APPLICATION

This application is a Continuation of International Application Ser. No. PCT/DE94/00512, filed May 5, 1994.

BACKGROUND OF THE INVENTION

Field of the Invention

The invention relates to a process for producing a catalyst containing a catalytically active molybdenum-vanadium-oxygen phase (Mo—V—C phase) and/or a molybdenum-vanadium-titanium-oxygen phase (Mo—V—Ti—O), to a catalyst produced by the process and to a catalyst carrier body for the catalyst. The catalyst is particularly suitable for the catalytic conversion of nitrogen oxides ($NO_x$) contained in exhaust gas or flue gas and is generally referred to as a $DeNO_x$ catalyst.

Published European Patent Application 0 470 334 A1, corresponding to U.S. Pat. No. 5,270,277, discloses an arsenic-resistant $DeNO_x$ catalyst and a process for producing it. In the application of the production process disclosed in that patent specification, an oxygen-rich Mo—V—O phase is produced which is cooled, ground and then subjected to a reducing treatment. In that treatment, oxygen defect sites are produced. The material so obtained is then ground, processed with additives to form a slip, applied to a support material such as, for example, expanded metal, and calcined together with the latter. The catalyst which is produced by that process as disclosed in the above-mentioned patent and application, is notable for an appreciable arsenic resistance and good catalytic activity in the reduction of nitrogen oxides with ammonia. However, in the case of that process the pure preparation of an oxygen-rich or low-oxygen Mo—V—O phase is virtually only possible with a disproportionately high expenditure. If that expenditure is not made, $V_2O_5$ precipitates, for example, may catalyze undesirable side reactions. Thus, it is known, for example, that in addition to the desired catalytic activity in the reduction of nitrogen oxides with $NH_3$, $V_2O_5$ also develops an undesirable catalytic activity in the $SO_2$—$SO_3$ conversion, which results in the formation of ammonium sulfate and/or ammonium hydrogen sulfate and in the case of a drop below the dewpoint of the sulfates, it leads to a gradual congestion of downstream components with the ammonium sulfate and/or the ammonium hydrogen sulfate.

SUMMARY OF THE INVENTION

It is accordingly an object of the invention to provide a process for producing a catalyst, a catalyst produced according to the process and a catalyst carrier body for the catalyst, which overcome the hereinafore-mentioned disadvantages of the heretofore-known processes and products of this general type and in which a catalyst having a catalytically active Mo—V—O phase and/or Mo—V—Ti—O phase can be prepared and obtained in a sufficiently pure form so that expensive subsequent purifications of the catalytic substance become unnecessary.

With the foregoing and other objects in view there is provided, in accordance with the invention, a process for producing a catalyst containing at least one of a catalytically active molybdenum-vanadium-oxygen phase (Mo—V—O phase) and a molybdenum-vanadium-titanium-oxygen phase (Mo—V—Ti—O phase), which comprises mixing molybdenum oxide $MoO_3$ and vanadium oxide $V_2O_5$ or precursors thereof with one another to produce a mixture having 0.7 parts by weight of vanadium oxide $V_2O_5$ and at least 1 part by weight of molybdenum oxide $MoO_3$; heating the mixture to a temperature of over 500° C. to produce an Mo—V—O phase; cooling and grinding the Mo—V—O phase; then subjecting the cooled and ground Mo—V—O phase to a reducing treatment; dispersing the reduced Mo—V—O phase on a heated oxidic support; and then grinding the dispersed material, applying the ground and dispersed material, optionally together with further additives, to a suitable macroscopic support and calcining the ground and dispersed material.

This process readily results in a pure Mo—V—O phase and/or Mo—V—Ti—O phase, in particular without special intervening purification steps, which phase, after application to a suitable macroscopic support, can be permanently sintered to the support. In this process, the Mo—V—O phase and/or Mo—V—Ti—O phase being formed is completely free of vanadium oxide. Which phase is ultimately produced depends on the temperature of the heated oxidic support. At fairly low temperature, the binary Mo—V—O phase tends to be present, and at a relatively high temperature as compared with the latter, the ternary Mo—V—Ti—O phase is present.

With the objects of the invention in view, there is also provided a process for producing a catalyst containing at least one of a catalytically active molybdenum-vanadium-oxygen phase (Mo—V—O phase) and a molybdenum-vanadium-titanium-oxygen phase (Mo—V—Ti—O phase), which comprises mixing molybdenum oxide $MoO_3$ and vanadium oxide $V_2O_5$ or precursors thereof with one another to produce a mixture having 0.7 parts by weight of vanadium oxide $V_2O_5$ and at least 1 part by weight of molybdenum oxide $MoO_3$; heating the mixture to a temperature of over 500° C. to produce an Mo—V—O phase; cooling and grinding the Mo—V—O phase; then subjecting the cooled and ground Mo—V—O phase to a reducing treatment; dispersing the reduced Mo—V—O phase on a heated oxidic support; then grinding the dispersed material; mixing the ground Mo—V—O phase in an acidic suspension with an oxidic support such as, for example, titanium oxide; kneading the ground material dispersed on the oxidic support with additives to form an extrudable compound; and extruding and then calcining the compound.

In this way it is possible to substantially avoid a decomposition of the Mo—V—O phase in the subsequent processing. Specifically, it was found that the extrusion of honeycomb-like catalyst carriers having high cell densities makes it necessary to add to the catalytically active Mo—V—O phase and/or Mo—V—Ti—O phase additives which render the mixture alkaline. Furthermore, however, it has been found that the Mo—V—O phase dispersed on the heated oxidic support is susceptible to a decomposition in the alkaline range during this operation. An acidic suspension, which can be achieved, for example, by using acidic titanium oxide, therefore provides the precondition which makes it possible to work in the alkaline range in the subsequent further processing of the catalytically active Mo—V—O phase and/or Mo—V—Ti—O phase without decomposing the Mo—V—O phase and/or Mo—V—Ti—O phase then dispersed on the oxidic support.

In accordance with another mode of the invention, a catalytically active Mo—V—O phase and/or Mo—V—Ti—O phase is provided, with the proportion of free $V_2O_5$ being below 0.05% by weight. This purity of the catalyst prevents undesirable side reactions from being catalyzed.

In accordance with a further mode of the invention, the ground Mo—V—O phase can be slurried before dispersion in a suitable dispersant and applied in this form to the heated oxidic support. In this process, water may be used as the dispersant. The water evaporates, together with other impurities, such as, for example $MoO_3$ upon striking the hot oxidic support and allows only the Mo—V—O phase to disperse on the oxidic support. The evaporated impurities can be discharged with the exhaust gas.

In accordance with an added mode of the invention, the ground Mo—V—O phase can be subjected before slurrying in a suitable dispersant, to a reducing treatment. This has the consequence of causing the oxygen defect sites which critically affect the catalytic activity to be present in the desired density in the Mo—V—O phase even before the dispersion. This reducing treatment additionally has the effect of reducing any traces of $V_2O_5$ which may be present at the same time. However, with the low oxidation number, the vanadium oxide is no longer able to catalyze the undesirable $SO_2$—$SO_3$ conversion.

In accordance with an additional mode of the invention, the ground Mo—V—O phase may be subjected to a reducing treatment during the dispersion on an oxidic support. This is associated with the advantage that both operations, the reducing treatment and the dispersion on an oxidic support, can be combined in a single operation. However, even in the case of the dispersion of a material that was already subjected previously to a reducing treatment, the reducing treatment has a further positive effect insofar as it prevents a renewed oxidation of the material.

In accordance with yet another mode of the invention, there is provided a method which comprises heating the oxidic support in a further development of the invention to from 250° to 600° C. during the dispersion. Heating above 600° C. may result in a partial destruction of the Mo—V—O phase and re-formation of vanadium oxide and molybdenum oxide.

In accordance with yet a further mode of the invention, the Mo—V—O phase is dispersed on a dust-type oxidic support in a fluidized-bed reactor. In this case, the slurried Mo—V—O phase can be introduced directly into a vortex reactor in which the oxidic support is whirled up in a hot vortex gas that may be a reducing gas. Thus, a pure Mo—V—O phase dispersed on $TiO_2$ and/or a pure Mo—V—Ti—O phase which partly has oxygen defect sites can be produced in a single operation while impurities are discharged with the hot vortex gas. In addition, the fluidized bed prevents an agglomeration of the dust-like particles.

In accordance with yet an added mode of the invention, before the dispersion of the Mo—V—O phase, it can be slurried together with an oxidic support in a dispersant. As a result, the precondition is created for enabling the precipitation to be carried out on another heated support which need not be an oxidic support.

In accordance with yet an additional mode of the invention, the catalytic activity for the reduction of nitrogen oxides on the catalyst does not undergo a reduction in the temperature range above 420° C. This became possible because the catalyst is free of $V_2O_5$. The latter catalyzes the oxidation of $NH_3$ with oxygen in the temperature range extending upwards from approximately 420° C. and consequently reduces the desired reduction of the nitrogen oxides with $NH_3$, with which it is in competition. This makes it possible to also advantageously use the catalyst downstream of combustion installations which operate discontinuously and in which the catalytic activity should therefore be maintained as uniformly as possible over very large temperature ranges.

In accordance with again another mode of the invention, there is provided a honeycomb-like catalyst carrier body having a high cell density in which one or more of the substances including a polar solvent, non-polar solvent, ammonia, a pore-former, clay minerals, film-forming aids and fillers/stabilizers are used as additives.

In accordance with again a further mode of the invention, there is provided a honeycomb-like catalyst carrier body having particularly high cell density in which a non-ionogenic thickening agent based on polyurethane is used as a further additive. Such a thickening agent brings about a stabilization of an extrudable kneading compound and improves the flow properties of the kneading compound.

In accordance with again an added mode of the invention, in order to improve the hardness of the walls of the honeycomb-like catalyst carriers, the extruded moldings are dried and are hardened in an $SO_2$ atmosphere and/or $SO_3$ atmosphere at 400° to 600° C. before the calcination. During this process step, some of the titanium oxide contained in the extruded molding is converted into gypsum-like titanium sulfate which brings about the increase in hardness.

With the objects of the invention in view, there is also provided a catalyst, comprising at least one of a catalytically active Mo—V—O phase and a catalytically active Mo—V—Ti—O phase, having a proportion of free $V_2O_5$ below 0.05% by weight.

In accordance with another feature of the invention, the catalytic activity for reduction of nitrogen oxides does not undergo any reduction in a temperature range above 420° C.

With the objects of the invention in view, there is additionally provided a catalyst carrier body, comprising a macroscopic support; and a catalyst being sintered onto the macroscopic support and being at least one of a catalytically active Mo—V—O phase and a catalytically active Mo—V—Ti—O phase, having a proportion of free $V_2O_5$ below 0.05% by weight.

In accordance with a further feature of the invention, the macroscopic support is a honeycomb form having a cell density of 5 to 100 cells per square inch and a crosspiece width of 0.35 to 2 mm.

In accordance with a concomitant feature of the invention, the macroscopic support is a honeycomb form having a cell density of 50 to 1200 cells per square inch and a crosspiece width of 0.1 to 0.6 mm.

Other features which are considered as characteristic for the invention are set forth in the appended claims.

Although the invention is illustrated and described herein as embodied in a process for producing a catalyst, a catalyst produced according to the process and a catalyst carrier body for the catalyst, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
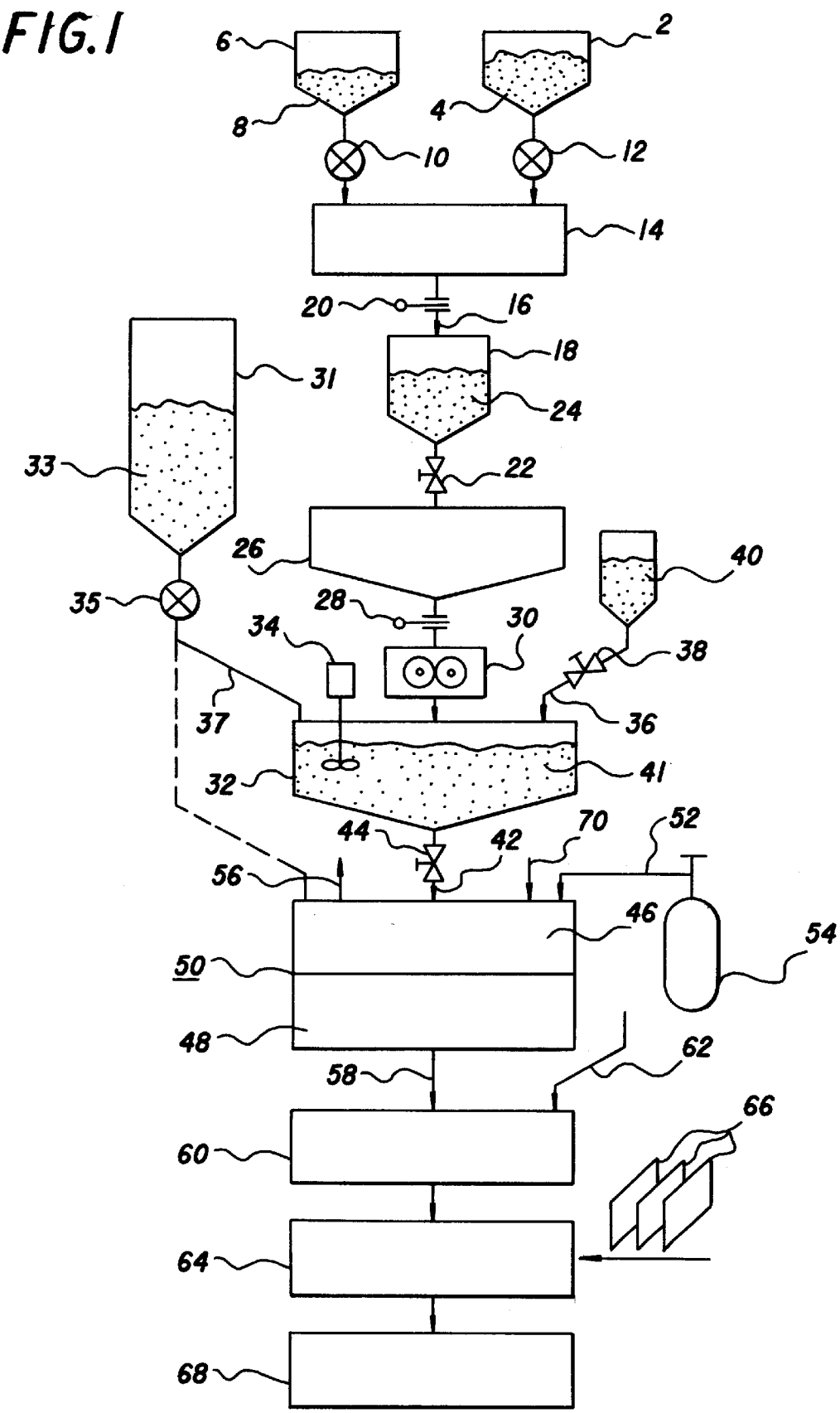
FIG. 1 is a simplified diagrammatic, schematic and block flow chart for the production of a catalyst carrier.

Referring now to the figures of the drawing in detail and first, particularly, to FIG. 1 thereof, there is seen a feedstock container 2 for vanadium oxide 4 and a feedstock container 6 for molybdenum oxide 8 alongside it at the top. Each feedstock container 2, 6 is connected to a mixer 14 through a respective metering device 10, 12. The mixer 14 is connected through a drainage pipe 16 to a melting device 18. A shut-off gate valve 20 is situated in the drainage pipe 16. A lower end of the melting device 18 has an outlet valve 22 through which a melt 24 can be admitted to a cooling tank 26. The cooling tank is connected to a grinding mill 30 through a further shut-off gate valve 28. The grinding mill discharges a ground product into a stirred tank 32. A stirring mechanism 34 is shown as extending into the stirred tank 32. A metering pipe 36 that is connected to the stirred tank has a feed valve 38 for a dispersant 40, which is water in the exemplary embodiment. In addition, a feedstock container 31 for $TiO_2$ 33 is connected to the stirred tank 32 through a feed pipe 37 that is fitted with a metering device 35. A delivery pipe 42 which is provided at the lowest point in the stirred tank 32 leads through a metering valve 44 to a dispersing device 46. In the exemplary embodiment of FIG. 1, the dispersing device 46 is combined with a grinding device 48 and incorporated in a gas-tight housing 50. The housing is connected through a separate gas pipe 52 to a gas container 54 for a reducing gas, which is hydrogen gas in the exemplary embodiment (although it could also be a hydrocarbon, carbon monoxide or the like). The housing 50 of the dispersing device additionally contains an exhaust-gas pipe 56. The grinding device 48 is connected through a drainage pipe 58 to a mixer 60 to which various additives can be added through a further feed pipe 62. A roller-coating device 64 is connected to the mixer 60. Macroscopic supports 66, preferably of expanded metal, are fed into the roller-coating device 64 and can be coated with material originating from the mixer. A sintering furnace 68 is connected to the roller-coating device 64.

In the exemplary embodiment a catalyst containing a catalytically active Mo—V—O phase is thus produced by metering vanadium oxide 4 and molybdenum oxide 8 in a ratio of 0.7 parts by weight of vanadium oxide $V_2O_5$ to 1 part by weight of molybdenum oxide $MoO_3$ into the mixer 14 through the two metering devices 10, 12 and mixing them therein intensively for several hours. The finished, that is to say the adequately uniformly mixed, compound is then introduced discontinuously, that is to say in individual batches, through the shut-off gate valve 20 and the drainage pipe 16 into the melting device and melted therein at a temperature of about 600° C., and preferably at 620° C. During this melting operation, an Mo—V—O phase to which the formula $V_xMo_yO_{32}$ can be assigned, is formed at a temperature above 600° C., where $x+y \leq 12$ and $x \geq 1$ and $y \geq 1$. However, this Mo—V—O phase is not free from $MoO_3$ that was originally used in excess. Molybdenum oxide or its precursor were used in excess in order to reliably incorporate all of the vanadium oxide in the Mo—V—O phase and to avoid free $V_2O_5$. After complete melting and a dwell time of about 15 minutes duration at a temperature above 610° C., this melt 24 is delivered into the cooling tank 26. Flakes are formed in the cooling tank as a consequence of the quenching effect. The flakes are then ground down to a particle diameter of less than 180 $\mu$m through the use of the grinding mill 30, and the powder is then fed into the stirred tank 32. In addition, the dispersant 40, preferably water, is supplied to the stirred tank so that a flowable slurry 41 results. In addition, a metered amount of an oxidic support, which is $TiO_2$ powder in the exemplary embodiment, is fed to the stirred tank 32 through the feed pipe 37 and the compound is then intensively mixed through the use of the stirring mechanism 34. The dispersing device 46 is continuously fed with the slurry which is produced in this way.

The dispersing device 46 used in the exemplary embodiment of FIG. 1 is a ball mill having balls which are formed of a very hard material. In the exemplary embodiment, the balls are heated to a temperature of 450° C. This is done by blowing the reducing gas, which is heated in a heating device that is not shown in further detail herein and with which the housing 50 of the dispersing device is filled, onto the balls. The gas is hydrogen gas in the exemplary embodiment. It may, however, also be carbon monoxide or another hydrocarbon. As the slurry drops onto the hot balls of the ball mill, the slurry, that is to say the Mo—V—O phase mixed with the $TiO_2$, precipitates on the hot balls under the action of temperature, in which process the Mo—V—O phase disperses on the $TiO_2$ powder and the dispersant, and also any other impurities that are possibly present such as, for example, $MoO_3$, evaporate. The latter are fed into the open air or into a non-illustrated recovery system through the exhaust or drainage pipe 56. The $MoO_3$ that was originally added in smaller amounts to the Mo—V—O phase along with the steam forms hydroxides which are volatile and which escape with the exhaust gas through the exhaust-gas pipe 56. The Mo—V—O phase precipitated on the balls of the ball mill and dispersed on $TiO_2$ is therefore free from $MoO_3$ and other impurities. The material precipitated on the balls of the ball mill is exposed to the reducing action of the hydrogen gas during the dispersion operation. That results in defects in the oxygen lattice of the Mo—V—O phase and, consequently, ultimately in the desired high catalytic activity of the Mo—V—O phase being produced. As a result of the mutual abrasion of the balls of the ball mill 48 with one another and at the wall of the ball mill, the material precipitated on the balls and dispersed on $TiO_2$ is removed from the surface of the balls. The material being removed drops down and can be intermittently fed into the downstream mixer 60 through the drainage pipe 58. In the mixer 60, the material being removed is mixed with known additives, such as clay and organic lubricants, to form a kneadable compound. The latter is roller-coated onto a macroscopic support, preferably the expanded-metal sheet 66, in the subsequent working step in the roller-coating device 64. The expanded-metal sheet which is coated in this way with the catalytically active compound is then calcined in the subsequent sintering furnace 68 to form a usable catalyst. In the operation which is carried out in the ball mill 48, Mo—V—Ti—O mixed oxide is also produced in addition to the Mo—V—O phase dispersed on $TiO_2$.

Figure 2:
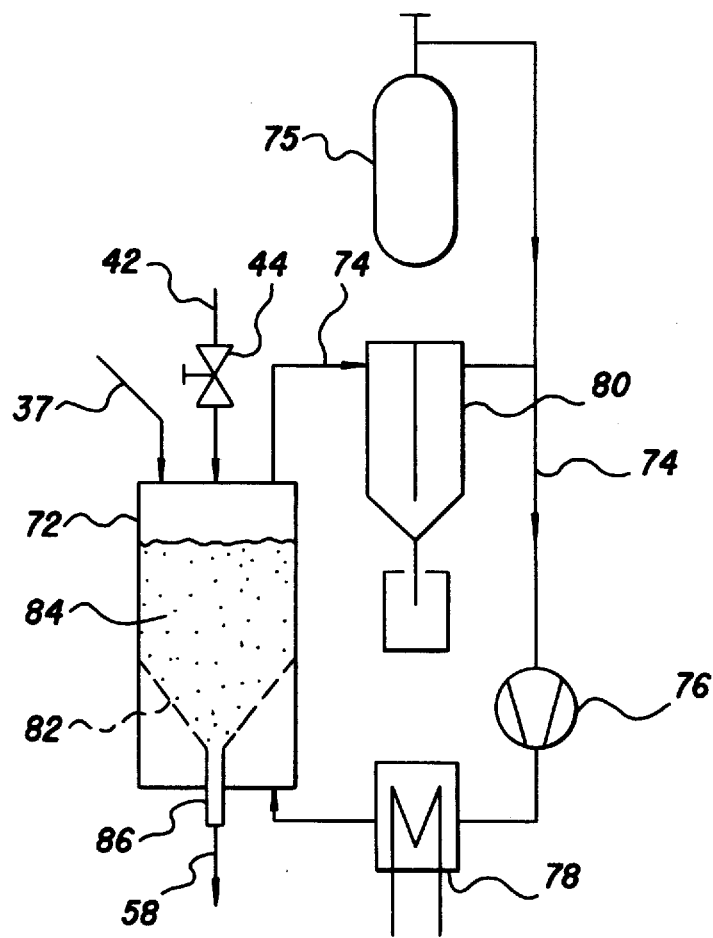
FIG. 2 is a diagrammatic and schematic view of a dispersing device shown in the flow chart according to FIG. 1.

FIG. 2 shows a variant of the exemplary embodiment of FIG. 1. A fluidized-bed reactor 72 is used instead of the dispersing and grinding device 46, 48. The feed pipe 37 of the feedstock container 31 for $TiO_2$ powder 33 is connected into the fluidized-bed reactor 72. In addition, a recirculation pipe 74 with a gas compressor 76 and a heating device 78 for the circulating gas is connected to the fluidized-bed reactor.

Hydrogen gas, which can be drawn from a gas feedstock container 75, is used as circulating gas in the exemplary embodiment. Incorporated in the recirculation pipe 74 is an intermittently operable recovery system 80 for the substances liberated during the dispersion. A drainage pipe 86 for the Mo—V—O phase dispersed on the $TiO_2$ powder and/or for a ternary Mo—V—Ti—O mixed oxide formed with $TiO_2$, is shown at a nozzle base 82 of the fluidized-bed reactor. The drainage pipe 86 opens into the drainage pipe 58 of the system according to FIG. 1.

In the production of a catalyst containing a catalytically active Mo—V—O phase, the procedure is initially as described with reference to the exemplary embodiment of FIG. 1.

However, as a departure therefrom no $TiO_2$ powder is added in the preparation of the slurry 41. Instead, a specified amount of $TiO_2$ is fed into the fluidized-bed reactor 72 after the gas compressor 76 for the circulating gas has been put into operation. At the same time, the circulating gas is heated as it flows through the heating device 78. It flows upwards through the nozzle base or sieve tray 82 of the fluidized-bed reactor 72 and produces a $TiO_2$ fluidized bed 84, which is heated to from 250° to 550° C., and 420° C. in the exemplary embodiment, through the use of the entrained heat. As soon as this temperature of the fluidized bed has been reached, the valve 44 of the delivery pipe for the slurry is opened and the slurry 41 of the Mo—V—O phase is poured dropwise onto the fluidized bed of the fluidized-bed reactor. In this process, the Mo—V—O phase disperses on the individual $TiO_2$ particles of the fluidized bed and/or forms a ternary Mo—V—Ti—O phase with $TiO_2$. At the same time, the water evaporates and any other impurities which are possibly present, such as excess $MoO_3$, evaporate in a similar form as was explained with reference to the exemplary embodiment of FIG. 1 in the case of the dispersing device 46 shown therein. Intermittently, the fluidized bed with the Mo—V—O phase dispersed on the $TiO_2$ powder and/or the Mo—V—Ti—O phase can then be drawn off through the drainage pipe 86, 58. The formation of a ternary Mo—V—Ti mixed oxide phase depends in these circumstances on the temperature in the fluidized bed of the fluidized-bed reactor 72. In this connection, the proportion of the ternary phase increases with increasing temperature at the expense of the proportion of the binary phase.

The dispersant that is entrained in the circulation, which is water in the exemplary embodiment, and the entrained proportions of $MoO_3$, can then be condensed out in the recovery system, which is essentially a cold trap, and recovered. The fluidized-bed reactor 72 can then be recharged with $TiO_2$ powder and treated with a new batch of the slurry. The further working steps are then again identical with those which were described with reference to the exemplary embodiment of FIG. 1.

The final result being produced is a catalyst in which superfine titanium oxide particles are coated with a dispersed, extremely pure molybdenum-vanadium-oxygen layer having an oxygen lattice which has individual oxygen defects and is consequently highly active. A ternary Mo—V—Ti mixed oxide phase having an oxygen lattice, that is to say a $V_{y-Mox-Tia-Oz}$ mixed oxide phase from the point of view of the empirical formula, is likewise produced in this process. As a result of the absence of free vanadium oxide and free molybdenum oxide, undesirable side reactions such as, for example, the $SO_2$—$SO_3$ conversion, are not catalyzed at the same time. Furthermore, a collapse in the catalytic activity no longer takes place in the upper temperature range because no free $V_2O_5$ is available which could oxidize $NH_3$ in competition with the $DeNO_x$ reaction at temperatures above 420° C. Instead of $TiO_2$, it is possible to use $SiO_2$, $Al_2O_3$ and argillaceous earth, or their mixtures as oxidic support.

Figure 3:
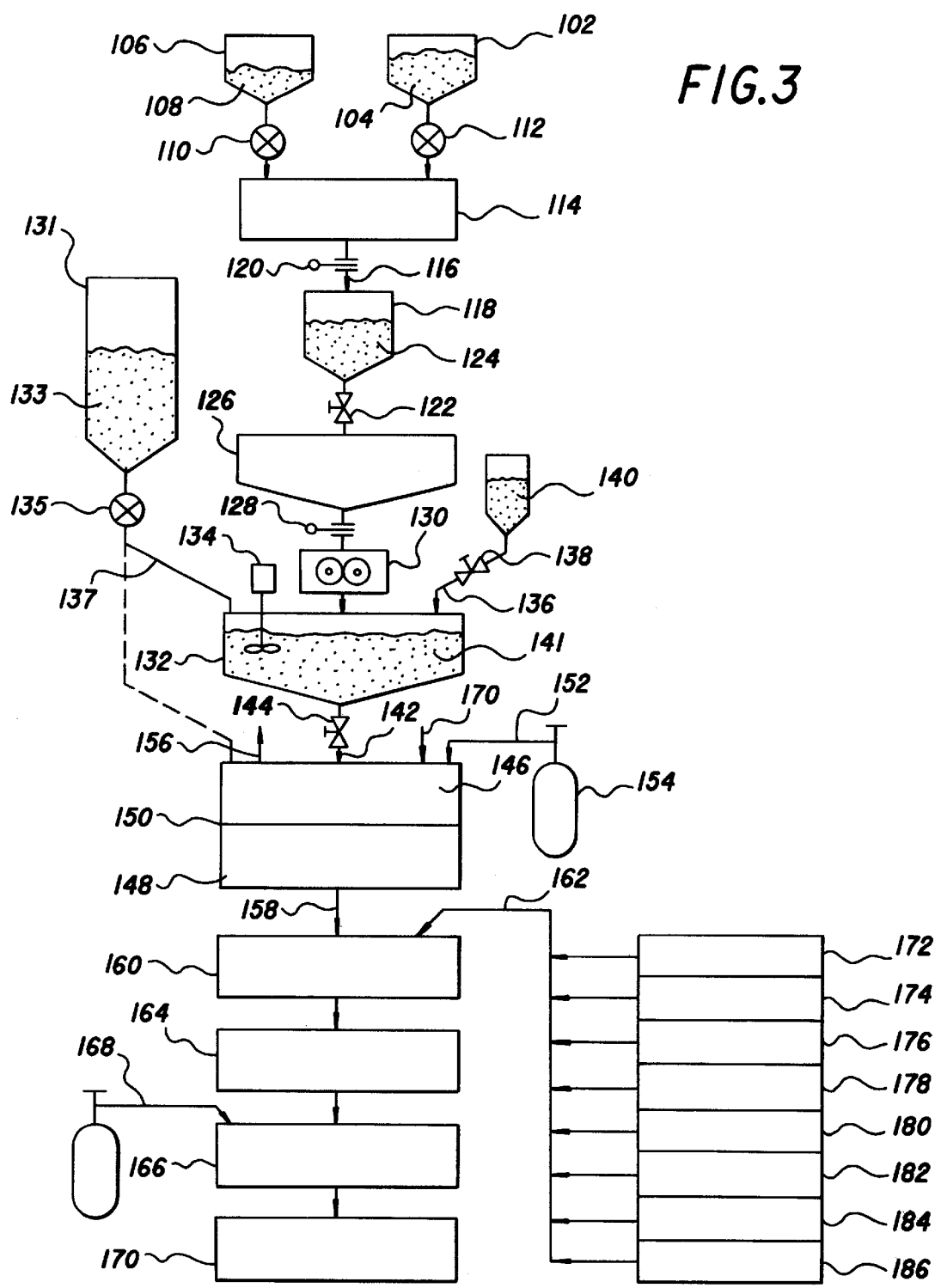
FIG. 3 is a simplified diagrammatic, schematic and block flow chart for the production of a honeycomb-like catalyst carrier.

FIG. 3 shows a feedstock container 102 for vanadium oxide 104 a feedstock container 106 for molybdenum oxide 108 alongside it at the top. Each of the feedstock containers 102, 106 is connected through a respective metering device 110, 112 to a mixer 114. The mixer 114 is connected through a drainage pipe 116 to a melting device 118. A shut-off gate valve 120 is situated in the drainage pipe 116. An outlet valve 122 is provided at a lower end of the melting device 118. A melt 124 can be admitted through the outlet valve 122 to a cooling tank 126. The cooling tank 126 is connected through a further shut-off gate valve 128 to a grinding mill 130. The grinding mill 130 discharges its ground product into a stirred tank 132. A stirring mechanism 134 is shown in the stirred tank 132. The stirred tank 132 is connected to a feed pipe 136 having a metering valve 138 for a dispersant 140, which is water in the exemplary embodiment. In addition, a feedstock container 131 for titanium oxide 133 is connected to the stirred tank 132 through a feed pipe 137 that is fitted with a metering device 135. A delivery pipe 142 which leads through a metering valve 144 to a dispersing device 146 is provided at the lowest point in the stirred tank 132. The dispersing device 146 is combined with a grinding device 148 and incorporated in a gas-tight housing 150. The housing 150 is connected through a separate gas pipe 152 to a gas container 154 for a reducing gas, which is hydrogen gas in the exemplary embodiment (although it could also be a hydrocarbon, carbon monoxide or the like). In addition, the housing 150 of the dispersing device contains an exhaust-gas pipe 156. The grinding device 148 is connected through a drainage pipe 158 to a mixer 160, to which various additives may be added through a further feed pipe 162. Honeycomb-like catalyst carriers that contain material originating from the mixer 160 are extruded in an extrusion device 164 connected to the mixer 160. A gas-tight, heatable container 166 which is connected to the extrusion device 164 can be fed with a sulfur dioxide and/or sulfur trioxide atmosphere through a gas feed pipe 168. A sintering furnace 170 is connected to the container 166.

A feedstock container 172 for a polar solvent, a feedstock container 174 for a non-polar solvent, a feedstock container 176 for ammonia, a feedstock container 178 for a pore former, a feedstock container 180 for clay minerals, a feedstock container 182 for a film forming aid, a feedstock container 184 for fillers/stabilizers and a feedstock container 186 for a non-ionogenic thickening agent, are connected in parallel with the feed pipe 162 for additives. In the exemplary embodiment, a catalyst containing a catalytically active Mo—V—O phase and/or an Mo—V—Ti—O phase is then produced by metering vanadium oxide 104 and molybdenum oxide 108 in the ratio of 0.7 parts by weight of vanadium oxide $V_2O_5$ to 1 part by weight of molybdenum oxide $MoO_3$ in the exemplary embodiment, into the mixer 114 through the use of the two metering devices 110, 112 and mixing them intensively therein for several hours. The finished, i.e. the adequately uniformly mixed, compound is then introduced discontinuously into the melting device 118 through the shut-off gate valve 20 and the drainage pipe 116 and is melted therein at a temperature of about 600° C. During this melting operation, an Mo—V—O phase to which the formula $V_xMo_yO_{32}$ may be assigned, where $x+y \leq 12$ and $x, y \geq 1$, is formed at a temperature above 600° C. However, this Mo—V—O phase is generally not free from molybdenum trioxide that was originally used in excess. Molybdenum oxide or its precursor was used in excess in order to reliably incorporate all of the vanadium oxide in the Mo—V—O phase and to avoid free vanadium pentoxide $V_2O_5$.

After complete melting, this melt 124 is delivered discontinuously into the cooling tank 126. Flakes form in the cooling tank 126 as a consequence of the quenching effect. The latter are ground down to a particle diameter of less than 180 μm through the use of the grinding mill 130, and the powder is then fed into the stirred tank 132. In addition, the dispersant 140, preferably water or a weak acid, for example very dilute sulfuric acid, is added to the stirred tank 132, thereby producing a flowable slurry 141. In addition, the oxidic support 133, which is titanium oxide powder in the exemplary embodiment, is fed into the stirred tank 132 through the feed pipe 137, and the compound is then intensively mixed through the use of the stirring mechanism 134. In order to reliably avoid a decomposition of the Mo—V—O phase formed in the slurry 141, work is carried out in the acidic range. On one hand, a weakly acid dispersant can be used for this purpose, as described above, but on the other hand, unneutralized titanium oxide from the sulfate process containing free sulfuric acid ($H_2SO_4$) as well as titanyl sulfate ($TiOSO_4$), which are acidic in aqueous solution, is also used. The dispersing device 146 is fed with the slurry 141 which is thus formed in a continuous flow. The dispersing device 146 used in the exemplary embodiment of FIG. 3 is a ball mill 148 having balls which are formed of a very hard material. The balls are heated in the exemplary embodiment to a temperature of 450° C. This is done by blowing the reducing gas, which is heated in a heating device that is not shown herein in further detail and with which the housing 150 of the dispersing device 146 is filled, onto the balls. The gas is hydrogen gas in the exemplary embodiment. However, carbon monoxide or a hydrocarbon may also be used. When the slurry 141 is poured dropwise onto the hot balls of the ball mill 148, the slurry 141, i.e. the Mo—V—O phase mixed with titanium oxide, precipitates on the hot balls under the action of temperature, with the Mo—V—O phase being dispersed on titanium oxide. In this process, a ternary $V_{y-Mo_x-Ti_a-O_z}$ mixed oxide phase is also formed. The dispersant and any other impurities that are possibly present such as, for example, still free molybdenum trioxide $MoO_3$, evaporate in this process. The latter are fed through the drainage pipe 156 into the open air or into a non-illustrated recovery system.

The molybdenum trioxide $MoO_3$ which was added and is still present in small amounts in the Mo—V—O phase is steam-volatile, i.e. it forms hydroxides which are volatile with the steam under these conditions and is discharged with the exhaust gas through the exhaust-gas pipe 156.

The Mo—V—O phase precipitated on the balls of the ball mill 148 and then dispersed on the titanium oxide and the ternary Mo—V—Ti mixed oxide are then free of molybdenum trioxide and other impurities, depending on the experimental conditions. The material precipitated on the balls in the ball mill 148 is exposed to the reducing action of the hydrogen gas during the dispersing operation. This results in defects in the oxygen lattice of the Mo—V—O phase and of the ternary Mo—V—Ti mixed oxide and, consequently, ultimately in the desired high catalytic activity of the Mo—V—O phase being produced and of the Mo—V—Ti mixed oxide. As a result of the mutual abrasion of the balls of the ball mill 148 with one another and at the wall of the ball mill 148, the material precipitated on the balls is removed from the surface of the balls. The material being removed drops down and can be intermittently fed into the downstream mixer 160 through a drainage pipe 148.

Figure 4:
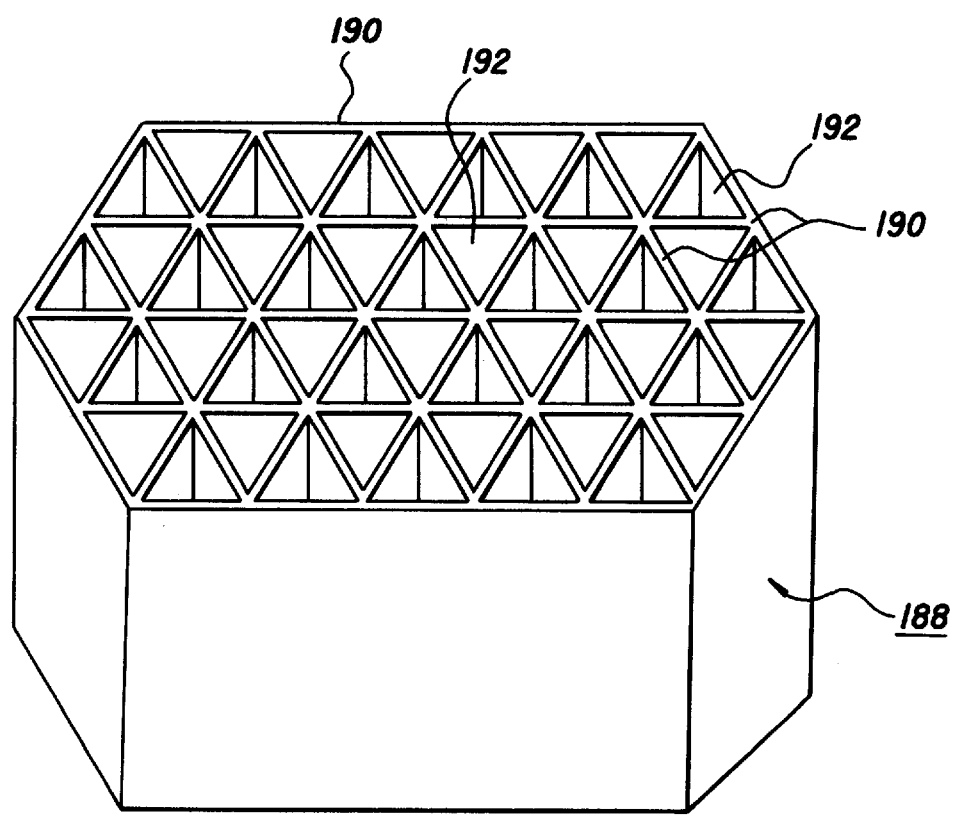
FIG. 4 is a perspective view of a honeycomb catalyst carrier produced according to the simplified flow chart of FIG. 3.

In the mixer 160, the material which is removed, i.e. the Mo—V—O phase dispersed on titanium dioxide and the Mo—V—Ti—O phase, is mixed with additives to form a kneadable compound which is then fed into the extrusion device 164. The molding or body formed in the extrusion device 164, for example a hexagonal honeycomb body having triangular gas channels (as is seen in FIG. 4), is then introduced into the heatable and gas-tight container 166 in which the molding is carefully dried and then hardened at a temperature of 450° C. in a sulfur dioxide and/or sulfur trioxide atmosphere. This hardening process is finally followed by a calcining operation in the sintering furnace 170, in which the molding is calcined to form a usable catalyst.

Since the slurry 141 is adjusted to a pH of less than 7 through the use of the dispersant 140 and/or through the use of the oxidic support 133, no decomposition of the Mo—V—O phase takes place in the slurry 141 and during the dispersion of the slurry 141, with the result that it is then possible to work in the alkaline range in the mixer 160 without decomposing the Mo—V—O phase or producing free vanadium or molybdenum oxide.

In particular, the additives added through the feed pipe 162 and their metering are important for the manufacture of honeycomb bodies having a high cell density and small cross-piece widths. In this exemplary embodiment the composition of the material mixed in the mill 160 includes:

a) about 42% by weight of titanium dioxide with V—Mo—O phase and ternary V—Mo—Ti—O phase dispersed thereon, with a proportion of the catalytically active phases of about 5% by weight being produced in the final honeycomb catalyst carrier, b) about 42% by weight of water from the feedstock container 172 for a polar solvent, with the proportion of water generally being 40 to 50% by weight, c) 0.75% by weight of monoethanolamine from the feedstock container 174 for a non-polar solvent, with this proportion generally being between 0.1 and 5% by weight, d) about 9% by weight of ammonia water from the feedstock container 176, with the proportion of ammonia generally being between 5 and 15% by weight, e) about 1% by weight of a pore former, which also acts as binder, such as, for example, cellulose, carboxylcellulose, resins, shellac and homopolymeric dispersants based on polyvinylacetate (Hm 105 supplied by the firm Elotex and/or acrylate/styrene copolymer), with this proportion generally being between 0.2 and 5% by weight, f) about 2.0% by weight of clay minerals such as, for example, montmorillonite, with this proportion generally being between 1 and 10% by weight, g) about 0.25% by weight of film forming aid such as, for example, diethylene glycol monobutyl ester (butyl diglycol), butylene glycol, isopropanol, ethyl glycol, polyethylene oxide, with this proportion generally being between 0.1 and 5% by weight, h) about 2.5% by weight of filler/stabilizer such as, for example, glass fibers having a diameter of 5 to 10 μm and a length of 1 to 6 mm, with this proportion generally being between 1 and 10% by weight, and i) about 0.5% by weight of a non-ionogenic thickening agent based on polyurethane such as, for example, Borchigel supplied by the firm Borchers or Collacral PU 85 supplied by the firm BASF, with this proportion generally being between 0.1 and 5% by weight.

FIG. 4 shows a honeycomb catalyst carrier 188 which is produced by the production process explained above, which has crosspieces 190 with a wall thickness of 0.1 to 0.6 mm depending on the extrusion tool being used, and in which a number of cells 192 can be adjusted from 50 to 1200 cells per square inch. Such honeycomb catalyst carriers 188, which can be used to reduce nitrogen oxide, to decompose polyhalogenated hydrocarbons such as, for example dioxins and furans, and for catalytic oxidation, can only be produced on the basis of the formulation described above. As already stated above in the presentation, the addition of film forming aids is necessary for this purpose because drying cracks are thereby avoided in the extruded compound. Furthermore, the non-ionogenic thickening agent based on polyurethane ensures a stabilization of the kneading compound and improves the flow properties of the kneading compound in the mixer 160. The homopolymeric dispersant furthermore serves as a binder and, together with cellulose or similar pore formers, ensures the formation of a desired pore structure. Due to the hardening which takes place in the container 166 and in which the catalyst carrier body is stabilized by a partial conversion of the titanium dioxide into titanium sulfates, the honeycomb catalyst carrier 188 is stable even with crosspiece widths of down to below 0.1 mm.

We claim:

1. A process for producing a catalyst containing at least one of a catalytically active molybdenum-vanadium-oxygen phase (Mo—V—O phase) and a molybdenum-vanadium-titanium-oxygen phase (Mo—V—Ti—O phase), which comprises:

mixing molybdenum oxide $MoO_3$ and vanadium oxide $V_2O_5$ or precursors thereof with one another to produce a mixture having 0.7 parts by weight of vanadium oxide $V_2O_5$ and at least 1 part by weight of molybdenum oxide $MoO_3$;

heating the mixture to a temperature of over 500° C. to produce an Mo—V—O phase;

cooling and grinding the Mo—V—O phase;

then subjecting the cooled and ground Mo—V—O phase to a reducing treatment;

dispersing the reduced Mo—V—O phase on a heated oxidic support having a temperature of 250° to 600° Celsius by mixing the ground Mo—V—O phase in an acidic suspension with the oxidic support;

then grinding the dispersed material;

kneading the ground material dispersed on the oxidic support with additives to form an extrudable compound; and extruding and then calcining the compound.

2. The process according to claim 1, which comprises carrying out the step of mixing the ground Mo—V—O phase in an acidic suspension with titanium oxide as the oxidic support.

3. The process according to claim 1, which comprises slurrying the ground Mo—V—O phase before dispersion in a suitable dispersant and applying the slurried and ground Mo—V—O phase to the heated oxidic support.

4. The process according to claim 1, which comprises subjecting the ground Mo—V—O phase to a reducing treatment before slurrying in a suitable dispersant.

5. The process according to claim 1, which comprises subjecting the ground Mo—V—O phase to a reducing treatment during the dispersion on an oxidic support.

6. The process according to claim 4, which comprises carrying out the reducing treatment at 250° to 600° C.

7. The process according to claim 1, which comprises carrying out the reducing treatment in an atmosphere having at least one gas selected from the group consisting of hydrogen, carbon monoxide, hydrocarbons and aromatics.

8. The process according to claim 1, which comprises dispersing the Mo—V—O phase on a dust-type oxidic support in a fluidized-bed reactor.

9. The process according to claim 1, which comprises slurrying the Mo—V—O phase together with an oxidic support in a dispersant, before the dispersion of the Mo—V—O phase.

10. The process according to claim 9, which comprises dispersing the slurry on heated balls of a ball mill.

11. The process according to claim 1, which comprises grinding the oxidic support together with the Mo—V—O phase dispersed thereon.

12. The process according to claim 1, which comprises dispersing the Mo—V—O phase on titanium oxide as the oxidic support.

13. The process according to claim 1, which comprises dispersing the Mo—V—O phase on silicon oxide as the oxidic support.

14. The process according to claim 1, which comprises dispersing the Mo—V—O phase on aluminum oxide as the oxidic support.

15. The process according to claim 1, which comprises dispersing the Mo—V—O phase on argillaceous earth as the oxidic support.

16. The process according to claim 1, which comprises kneading the ground material with at least one additive selected from the group consisting of a polar solvent, a non-polar solvent, a pore former, clay minerals, a film forming aid and a filler/stabilizer.

17. The process according to claim 1, which comprises adding a non-ionogenic thickening agent based on polyurethane as a further additive.

18. The process according to claim 1, which comprises drying and hardening the extruded compound in an atmosphere selected from the group consisting of sulfur dioxide and sulfur trioxide at 400° to 600° C. before the calcination.

* * * * *